United States Patent [19]

Ramponi et al.

[11] Patent Number: 5,217,606
[45] Date of Patent: Jun. 8, 1993

[54] DOUBLE-FILTERING FILTER FOR VEHICLE ENGINE LUBRICANTS, WITH COMPRESSIBLE FINE FILTERING CARTRIDGE

[75] Inventors: Claudio Ramponi, Giaveno; Silvano Casalicchio, Bruino; Mauro Gallino, Grugliasco, all of Italy

[73] Assignee: Gilardini S.p.A., Turin, Italy

[21] Appl. No.: 844,139

[22] Filed: Mar. 2, 1992

[30] Foreign Application Priority Data

Nov. 20, 1990 [IT] Italy .............................. 67904 A/90

[51] Int. Cl.$^5$ ............................................. B01D 27/14
[52] U.S. Cl. ..................... 210/136; 210/316; 210/352; 210/438; 210/440; 210/450; 210/492; 210/DIG. 13; 210/DIG. 17
[58] Field of Search ............... 210/136, 316, 352, 438, 210/440, 450, 488, 492, DIG. 13, DIG. 17

[56] References Cited

U.S. PATENT DOCUMENTS

| | | | |
|---|---|---|---|
| 3,353,680 | 11/1967 | Niebergall | 210/440 |
| 4,265,748 | 5/1981 | Villani et al. | |
| 4,738,776 | 4/1988 | Brown | 210/DIG. 13 |
| 5,041,221 | 8/1991 | Drusi | 210/493.1 |

FOREIGN PATENT DOCUMENTS

| | | |
|---|---|---|
| 0362554 | 4/1990 | European Pat. Off. |
| 608531 | 9/1948 | United Kingdom |
| 710621 | 6/1954 | United Kingdom |
| 773355 | 4/1957 | United Kingdom |

Primary Examiner—Matthew O. Savage
Attorney, Agent, or Firm—Reed Smith Shaw & McClay

[57] ABSTRACT

An oil filter for providing coarse and fine filtration of lubricating oil in an internal combustion engine is disclosed herein. The oil filter includes a cylindrical housing closed by a cover containing a coarse-filtering cartridge of pleated paper included between a lower plate and an upper plate, and a fine-filtering cartridge placed between the coarse-filtering cartridge and the cover. The fine-filtering cartridge is supported between a lower base plate and an upper base plate arranged to bear against the cover. Both filtering cartridges have a cylindrical shape with axial recesses extending therethrough. The fine-filtering cartridge is composed of a band of filtering paper disks, the band being bent as an accordion. The upper base plate is integrally formed with to a first end of a barrel with the barrel coaxially extending through the axial recess of said fine-filtering cartridge and partially into the axial recess of said coarse-filtering cartridge. The filter includes means for fixedly attaching the upper plate of the coarse-filtering cartridge about said barrel, with the lower base plate being slidably attached about the barrel. A helical compensating spring is placed between the upper plate of the coarse-filtering cartridge and the lower base plate of the fine-filtering cartridge for compressingly stressing the fine-filtering cartridge towards said housing cover.

8 Claims, 3 Drawing Sheets 5,217,606

DOUBLE-FILTERING FILTER FOR VEHICLE ENGINE LUBRICANTS, WITH COMPRESSIBLE FINE FILTERING CARTRIDGE

BACKGROUND OF THE INVENTION

1. Field of the Invention

The present invention refers to a double-filtering filter for vehicle engine lubricants, with compressible fine filtering cartridge.

2. Background Information

In the European Patent Application published with N°. 0362554, a filter for vehicle engine lubricants is described, comprising a fine-filtering cartridge and a coarse-filtering cartridge crossed in parallel by the dirty lubricant, that, after having been filtered, is directed towards a central outlet hole (lubricant coming from coarse filtering) and towards an eccentric outlet hole (lubricant subjected to fine filtering). The fine filtering cartridge is composed of a filtering paper pack obtained by bending as an accordion a lobe disk band, that, in time and as an effect of lubricant impregnation, tends to lose its original compactness, spacing one disk from the other. This worsen the filtering capacity of the cartridge. Furthermore, this filter comprises a certain number of components placed below the closing plate, to avoid oil discharge if the filter is assembled on the engine with inlet holes facing downwards, and this affects manufacturing costs.

SUMMARY OF THE INVENTION

Purpose of the present invention is eliminating or reducing the above-said inconveniences, realizing a double-filtering filter of the above-mentioned type, in which the fine filtering cartridge is constantly compact in order to ensure the maximum filtering efficiency for all the filter life, and in which simple and effective means are provided to prevent lubricant discharge from filter inlet holes, if it is assembled with its inlet holes facing downwards.

The above-said and other purposes and advantages of the invention, as resulting from the following description, are reached with a double-filtering filter for vehicle engine lubricants, comprising:

a cylindric bell closed by a cover, containing:
a coarse-filtering cartridge, and
a fine-filtering cartridge, placed between said coarse-filtering cartridge and the cover;
both said filtering cartridges having a cylindrical crown shape with axial recesses aligned, said fine-filtering cartridge being composed of a filtering paper band bent as an accordion;
a small barrel, with its base facing said cover and extending up to inside the axial recess of said coarse-filtering cartridge;
a series of peripheral inlet holes for the lubricant to be filtered, a central outlet hole for lubricant subjected to coarse filtering and at least an outlet hole for lubricant subjected to fine filtering, all said holes being provided in said cover;
a pair of sealing gaskets on the external side of said cover;
wherein said fine-filtering cartridge is compressively stressed towards said bell cover by a spring pressed against a base plate of the cartridge itself, and reacting against an upper plate of said coarse-filtering cartridge.

Another characteristic of the invention is the fact that said peripheral inlet holes for the lubricant to be filtered are clogged along the discharge direction by a gasket pressed against said cover by a pair of circular ribs extending from the base of said small barrel, said gasket having a concave section suitable to keep the holes clogged when no lubricant is pressure-sent inside the filter.

A preferred embodiment of the invention will now be described, as a non-limiting example, with reference to the enclosed drawings

DESCRIPTION OF PREFERRED EMBODIMENTS

Figure 1:
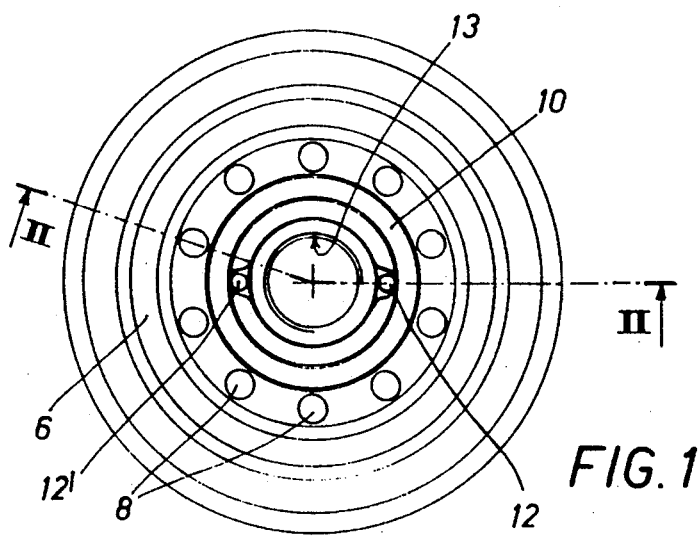
FIG. 1 is an upper plan view of a preferred embodiment of a filter according to the present invention.
Figure 2:
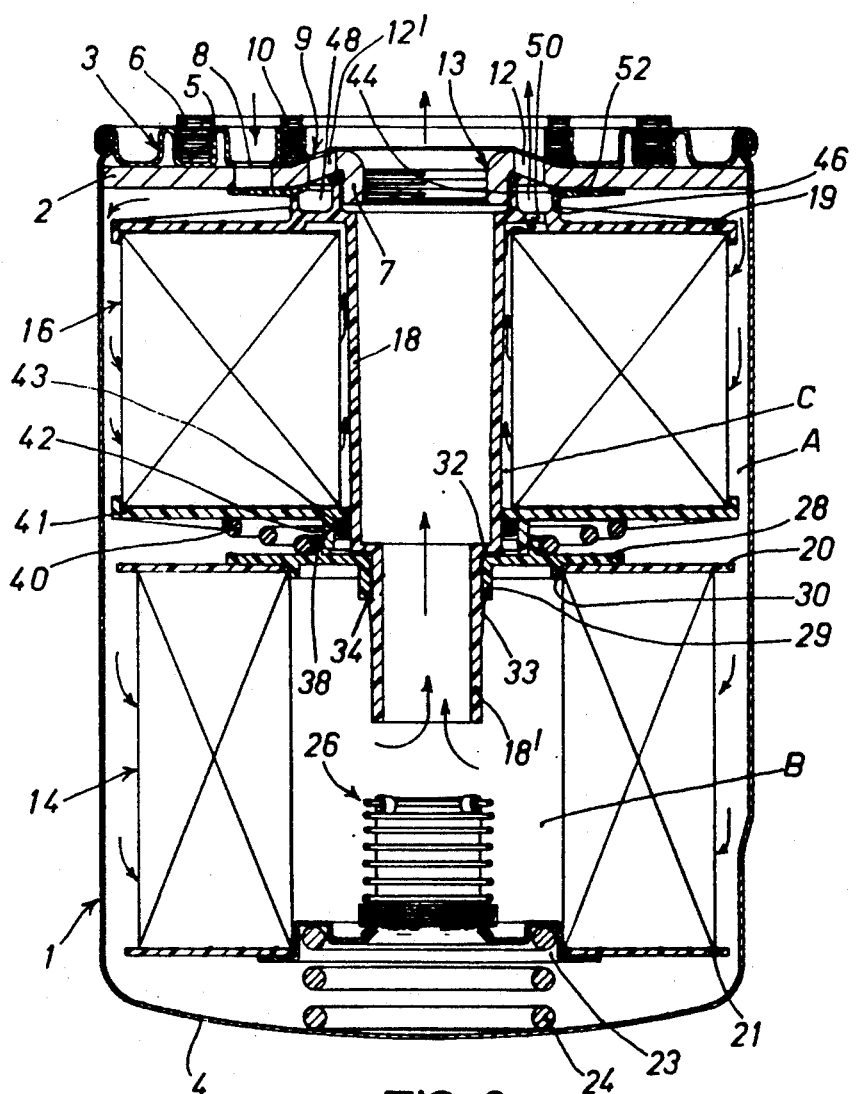
FIG. 2 is a sectioned view along line II—II of FIG. 1.

Referring to FIGS. 1 and 2, numeral 1 indicates the cylindrical housing made of drawn sheet that contains the real filter. The housing 1 is closed by a sheet cover 2, forced inside the housing mouth and secured to it via a metallic ring 3, folded to the housing edge in a known way. The ring 3 is pressed with a circular groove 5 that composes the seat of a gasket 6, external to a series of peripheral inlet holes 8 of the lubricant into the housing. A series of corresponding holes, that will be identified below as holes 8, is provided into the cover 2; these holes are aligned, when assembling, to the holes 8 in the ring 3. Another ring 9 is assembled between the ring 3 and the housing center, defining together with the ring 3 a seat for a second circular gasket 10, placed at a radially intermediate distance between the peripheral holes 8 and a pair of eccentric holes 12, 12' provided both on the ring 9 and on the cover 2 in diametrally opposite positions. At the cover center, finally, an axial hole 13 is realized, for the lubricant outlet, as will be said after. The hole 13 is defined inside a short flange 7 of the cover, and is threaded to enable screwing the filter to an adequate threaded union in the engine block. The housing contains a coarse-filtering cartridge 14 and a fine-filtering cartridge 16, the latter one between the cartridge 14 and the cover 2. They both have a cylindrical shape and are assembled overlapped, with their central recesses aligned along the housing axis. A small barrel 18 made of synthetic resin is axially assembled in the housing, inside the central recesses of the filtering cartridges. The small barrel 18 is integrally formed with a circular base 19 facing the cover 2. Between the filtering cartridges 14 and 16 and the housing 1, therefore, a first chamber A is defined. A second chamber B is instead defined inside the coarse-filtering cartridge 14, while a third chamber C is defined between the fine-filtering cartridge 16 and the small barrel 18.

Figure 5:
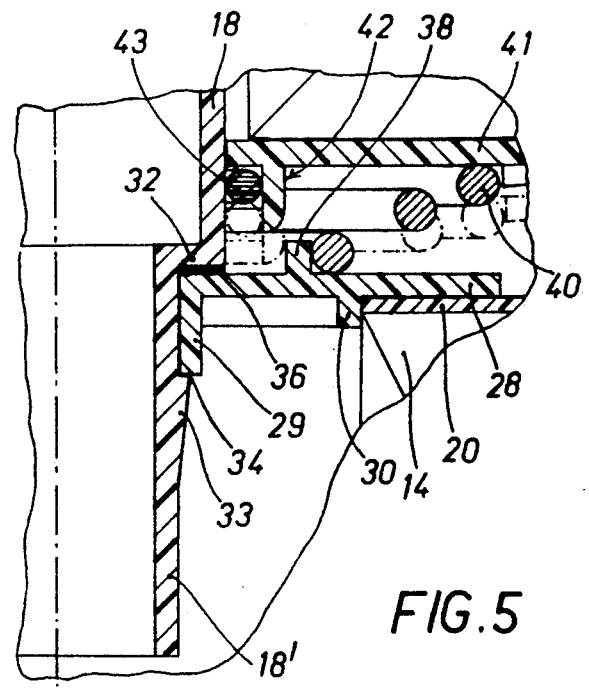
FIG. 5 is an enlarged sectioned view of a part in FIG. 2.

The coarse-filtering cartridge, 14 is composed of pleated paper closed between upper plate 20 and lower plate 21. The paper porosity is such as to keep particles whose diameter is greater than 15-20 μm. It is assembled with its lower plate 21 on a plate 23 supported by an helical spring 24 reacting against the housing bottom 4. An anti-clogging valve, globally indicated as 26, is provided at the center of the plate 23. A plate 28 rests on the upper plate 20, centrally formed with a collar 29 and an intermediate rib 30 inserted into the axial recess of the cartridge 14, to center this latter one inside the housing. Next to the collar 29, the small barrel 18 shows a step 32 that originates a terminal section 18' of the small barrel, whose diameter is reduced, composing the part penetrating into the axial recess of the coarse-filtering cartridge 14. The collar 29 of the plate 28 is abutted against this step, and is made slide—when assembling—on a frustum-of-cone-shaped part 33 of the small barrel 18', ending with a tooth 34, after which the collar 29 cannot be subjected to axial translations any more, and is therefore fixed to the small barrel. This manufacturing property is better shown in FIG. 5, that provides an enlarged view of it. The plate 28 further composes the seat for a ring gasket 36, acting against the step 32 of the small barrel 18, to prevent the non-filtered oil blow-by between first chamber A and second chamber B.

Between the rib 30, on which the cartridge 14 is braided, and the collar 29, a second rib 38 is provided on the plate 28, facing the cover, defining the seat for an helical frustum-of-cone-shaped compensating spring 40. The spring 40 presses with its wide upper turn against an upper plate 41, composing the support for the fine-filtering cartridge 16. The plate 41 shows a central hole in which the small barrel 18 passes, with a chance of the plate's sliding with respect to the small barrel. To ensure the hydraulic seal of the cartridge 16, the plate 41 is provided in its lower side with a seat 42, where an 0-ring-type gasket 43 is housed pressed against the small barrel 18, over the step 32. The fine-filtering cartridge 16 is pressed between the plate 41 and the base 19 of the small barrel 18. From the base 19, along the cover 2 direction, two coaxial circular ribs 44 and 46 extend. Between them, a channel 48 is defined, in which at least one hole 50 is realized preferably aligned with the holes 12 of the cover 2 and of the external ring 3. The internal rib 44 externally clamps the short central flange 7 of the cover 2, and blocks in position against the cover 2 a gasket 52, composed of a disk made of elastomeric material, shown in detail in FIG. 3 and 4. The external rib 46, whose height is less than that o rib 44, is pressed against the gasket 52, in an internal position with respect to the peripheral holes 8.

Figure 3:
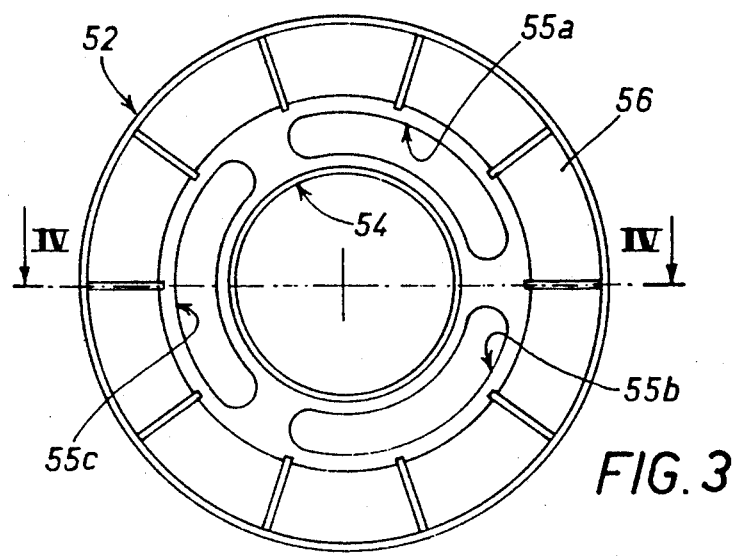
FIG. 3 is a plan view of a preferred embodiment of a filter gasket according to the present invention.
Figure 4:
FIG. 4 is a sectioned view along line IV—IV of FIG. 3.

With reference to FIG. 3 and 4, the gasket 52 is composed of a disk made of elastomeric material with a central hole 54, whose diameter is not much greater than that of the flange 7 of the cover, on which the gasket is braided. At a distance from the center corresponding about to the one in which the holes 12, 12' are realized on the cover, three oblong holes 55a, 55b, 55c are then provided on the gasket 52, whose radial extension does not exceed that of the channel defined between the ribs 44 and 46 of the small barrel base. The peripheral part 56 of the gasket 52 extends till it covers, in the assembled arrangement, the cover holes 8. As results from FIG. 4, the gasket 52 is not planar, but has a concave shape with V-section, to be fitted to the cover 2 outline in the area extending from the flange 7 to the holes 8. In the assembled holes 55a, 55b, 55c allow arrangement, the oblong communication of the circular channel 48, defined on the base 19 of the small barrel 18, with one of the holes 12, 12' of the cover; it is evident that one of the holes 12, 12' will be corresponding with one of the three holes 55a, 55b, 55c of the gasket 52 for any arrangement of this latter one with respect to the cover 2. This allows realizing the gasket assembling without taking into account the disposition of the holes 55a, 55b, 55c. The non-planar configuration of the cover in the gasket 52 and the different height of the ribs 44 and 46 make, in the assembled arrangement, the gasket 52 adhere to the cover 2, clogging the holes 8 inside but leaving the holes 12, 12' and 13 always free. The gasket 52 acts, with respect to the holes 8, as unidirectional shut-off valve, since its external part 56 is yielding when the lubricant under pressure enters through the holes 8, while it does not allow output of liquid from the filter, even if the latter is assembled upside down, that is with its bottom 4 up and the cover down. At the same time, the gasket 52 ensures seal of the lubricant flowing in the duct 48 towards the hole 12 or 12' from the blow-by externally, that is towards the inlet holes 8, and internally, that is towards the central discharge hole 13. This double function is made possible by the particular space configuration of the gasket, without help from the springs, for the sole stressing effect of ribs 44 and 46.

Figure 7:
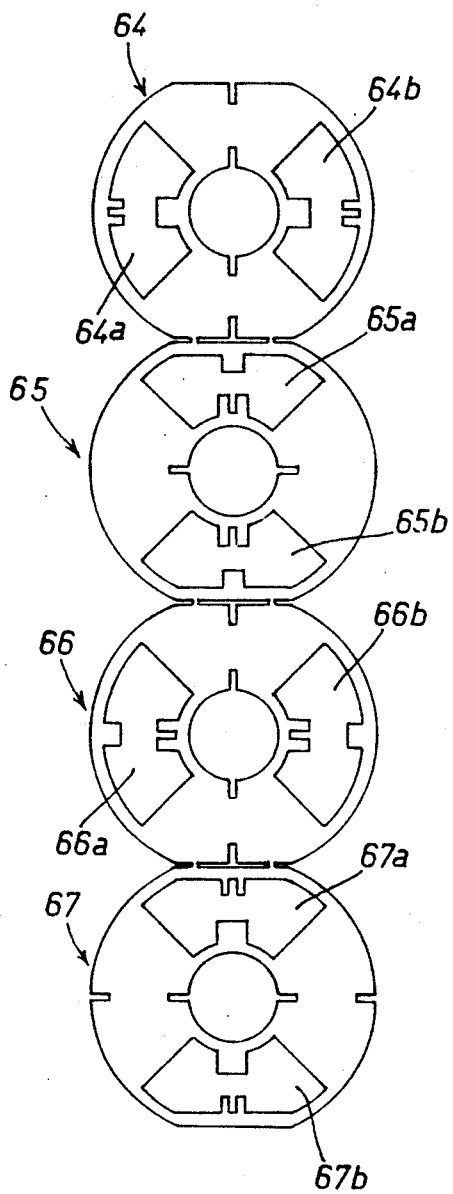
FIGS. 6, 7 and 8 are plan views of three different embodiments of the filtering disks of the fine-filtering cartridge.
Figure 8:
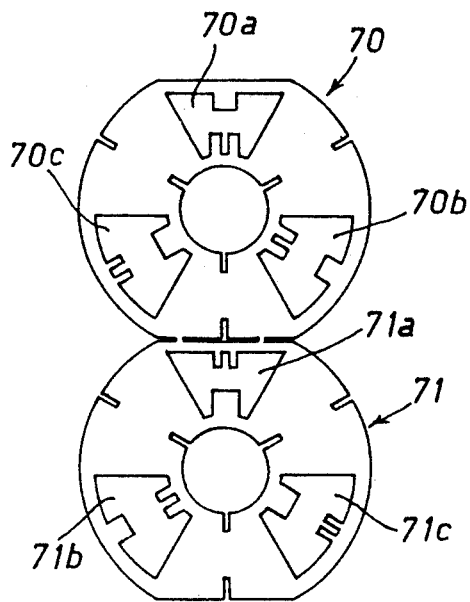
Figure 6:
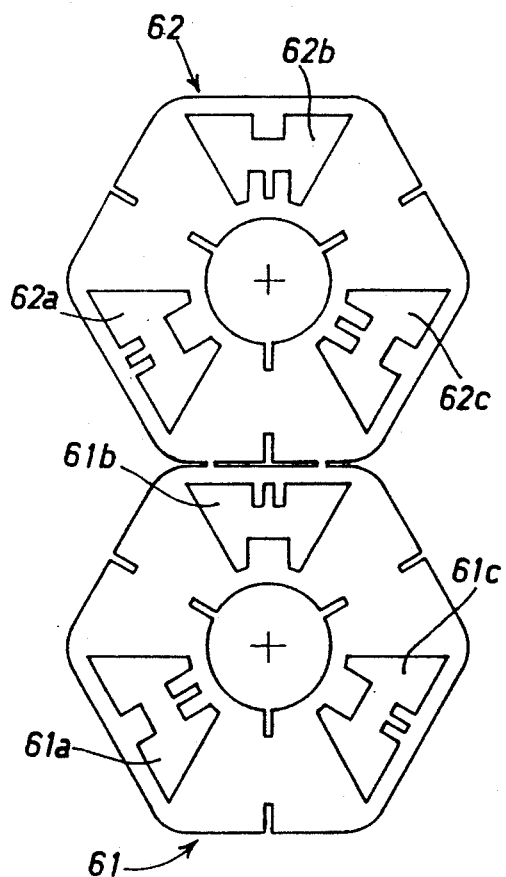

In FIGS. 6, 7 and 8, three different examples of filtering paper disk bands are shown, that can be advantageously used to obtain, once bent as an accordion, a fine-filtering cartridge 16.

In FIG. 6, the major unit, that is the unit always repeated equal to itself, is composed of a pair of plane elements 61 and 62, hexagonally shaped, each one comprising a central hole and three holes 61a, 61b, 61c and 62a, 62b, 62c, placed in order to be offset after having bent the band. In FIG. 7, the major unit is composed of four diskettes 64, 65, 66, 67, each one equipped with a central hole and a pair of opposed holes 64a, 64b, 65a, 65b, 66a, 66b, 67a, 67b, that are offset after having bent the band. Inside each hole, there are appendixes that are oriented and shaped in different ways for each diskette, suitable to adequately orient the lubricant flow during filtering. In FIG. 8, the major band unit is composed of a pair of diskettes 70 and 71, each one equipped with a central hole and three offset holes 70a, 70b, 70c and 71a, 71b, 71c. Other diskette shapes are obviously possible. In any case, the band bent as an accordion, or zigzag-bent, becomes a cylindrical filtering cartridge, or that approximates the cylindrical shape, if the band is the FIG. 6 one. It is positioned and centered in the housing 1 through the plate 41 and the base 19 of the small barrel 18. This type of cartridge allows keeping particles whose sizes are 3-4 μm, and therefore subjecting the lubricant to a very high filtration. It has however revealed, after a certain period of use, the inconvenience of losing compactness and becoming slack along the axial direction, with the result that the overlapped disks are spaced one from the other and the filtering effectiveness decreases. The property of subjecting the cartridge to the action of an on-load spring, solves the above-mentioned inconvenience, since the spring allows automatically and continuously recovering the diskette spacing, with the result that compactness and filtering capacity of the cartridge are always ensured. This function is pointed out by the hatch-dot representation in FIG. 5, that shows the original position of the compensating spring 40. After a certain period of use, an axial slackening of the cartridge 16 occurs, that is however recovered by the upward thrust induced by the spring, until the position represented by the continuous-line drawing is reached.

The general operation of the described filter is the known one of double-filtering filters with fine filtering realized in a by-pass circuit that discharges in the oil sump, at atmospheric pressure.

The lubricant enters under pressure through the holes 8 in the cover and goes into the hollow space A between the filtering cartridges and the bell, as indicated by the arrows in FIG. 2, then it crosses in parallel the fine-filtering cartridge and the coarse-filtering one. Owing to the greater hydraulic resistance of the fine-filtering cartridge 16, only a small fraction of lubricant goes through this cartridge, while the greatest part of the lubricant goes through the coarse-filtering cartridge 14 and enters into the second chamber B (FIG. 2). However, after a certain number of lubricant circulations in the filter, it can be deemed completely subjected to fine filtration too.

The lubricant that went through the coarse-filtering cartridge 14 rises back into the second chamber B through the small barrel 18, goes out from the hole 13 and is sent to the members to be lubricated.

The lubricant that went through the fine-filtering cartridge 16, instead, rises back through the hollow space C defined between small barrel 18 and cartridge 16, and, through the hole 50 on the small barrel base 19, goes out into the circular channel 48. Since the channel 48 is sealed by the gasket 52, the filtered lubricant can go out of the filter only through one of the holes 55a, 55b or 55c of the gasket 52, and one of the holes 12, 12' on the cover. From here, the lubricant is sent to the sump, where the pressure is the atmospheric one. This because in this way the pressure difference is increased at the two fine-filtering cartridge sides, in order to facilitate the passage of lubricants through it and to win the high hydraulic resistance opposed by it.

It must be noted that the two lubricant flows of fine-filtering and coarse-filtering are kept separated one from the other and with respect to the lubricant to be filtered, by the gaskets 43 and 36, in addition to the gasket 52 under the cover. The gasket 43 is translated with the plate 41 due to the compensating spring 40: it prevents lubricant blow-by between first chamber A and third chamber C. The gasket 36 prevents instead lubricant blow-by between chambers A and B. The anti-clogging valve 26 is calibrated to open when the cartridge 14 is clogged and does not allow any more the lubricant to cross itself: in this way, a pressure increase in first chamber A would occur, that would cause the opening of valve 26, through which the dirty lubricant would directly be discharged in the second chamber B and then in the axial hole 13.

Although the present invention has been described with reference to preferred embodiments, numerous modifications and rearrangements can be made, and still the result will come within the scope of the invention.

What is claimed is:

1. A double-filtering filter for vehicle engine lubricants, comprising:
    a cylindrical housing having a first end closed end and a second end closed by a cover;
    said housing containing a coarse-filtering cartridge, composed of pleated paper, included between a lower plate and an upper plate, the lower plate being located adjacent said first closed end, said lower end plate being assembled to a plate supported by a helical spring reacting against said first closed end of the housing;
    said housing containing a fine-filtering cartridge, placed between the coarse-filtering cartridge and the cover, said fine-filtering cartridge being supported between a lower base plate and an upper base plate, said upper base plate being located adjacent said cover, both said coarse-filtering cartridge and said fine-filtering cartridge having a cylindrical shape with axial recesses extending therethrough, said recesses being axially aligned with one another, said fine-filtering cartridge being composed of a band of filtering paper disks, said band being bent as an accordion;
    a barrel having first and second ends and a bore extending therethrough, said upper base plate being integrally formed with and fixedly attached to said first end of the barrel, said upper base plate bearing against said cover, said barrel coaxially extending through the axial recess of said fine-filtering cartridge and partially into the axial recess of said coarse-filtering cartridge, means for fixedly attaching the upper plate of the coarse-filtering cartridge about said barrel, said lower base plate supporting the fine-filtering cartridge being slidably attached about said barrel;
    said cover having a series of peripheral inlet holes for the lubricant to be filtered, said inlet holes being located on a coaxial circumference with respect to the filter housing, said cover also having a central outlet hole for lubricant subjected to coarse filtering and said cover also having at an outlet hole for the lubricant subjected to fine filtering;
    a first chamber, placed downstream of the inlet holes and upstream of the coarse-filtering cartridge and the fine-filtering cartridge;
    a second chamber, placed downstream of the coarse-filtering cartridge and upstream of the central outlet hole, for lubricant subjected to coarse-filtering;
    a third chamber, placed downstream of the fine filtering cartridge and upstream of the outlet hole, for lubricant subjected to fine filtering;
    a first filtering gasket placed on the opposite side of the cover with respect to an interior of the housing, said first sealing gasket being coaxially located around the circumference on which the inlet holes lie;
    a second sealing gasket placed on the opposite side of the cover with respect to the interior of the housing, said second sealing gasket being coaxially located inside the circumference on which the inlet holes lie;
    a helical compensating spring placed between the upper plate of the coarse-filtering cartridge and the lower base plate of the fine-filtering cartridge, said spring compressingly stressing said fine-filtering cartridge towards said housing cover, by pressing against said lower base plate and by reacting against said upper plate.

2. A filter according to claim 1, wherein said lower base plate of said fine-filtering cartridge is formed with a seat to house a ring gasket, sealing between said fine-filtering cartridge and said small barrel.

3. A filter according to claim 1, wherein said means for fixedly attaching said upper plate of said coarse-filtering cartridge to said barrel comprises a step on an outer surface of the barrel, the diameter of the barrel between the second end and said step being smaller than the diameter between the first end and said step, the portion of the barrel between the second end and the step comprising a frustoconical tapered part enlarging towards said upper base plate ending in a shoulder forming a tooth that engages a collar of said upper plate and locks it to the barrel between said step and said tooth.

4. A filter according to claim 3, further including a ring gasket, wherein said upper plate of the coarse-filtering cartridge comprises an upper rib seat for a lower side of said compensating spring reacting against said upper plate of said coarse-filtering cartridge, a lower rib to center the coarse-filtering cartridge on said upper plate, said upper plate including a seat facing said step for the ring gasket, said ring gasket surrounding said barrel and being included between said seat and said step, said ring gasket sealing between said coarse-filtering cartridge and said barrel.

5. A filter according to claim 1, wherein said series of inlet holes for the lubricant to be filtered are clogged along the discharge direction by a gasket pressed against said cover by a pair of circular ribs extending from the upper base plate of said small barrel towards said cover, said gasket having a concave section suitable to keep the holes clogged when no lubricant is pressure-sent inside the filter.

6. A filter according to claim 5, wherein said gasket has a V-shaped section with its concavity facing said cover, and is equipped with at least one hole aligned with said outlet hole of the lubricant subject to fine filtration.

7. A filter according to claim 5, wherein said circular ribs of said upper base plate of the barrel define a circular channel, said channel including at least one hole extending through said upper base plate and communicating with a hollow space defined between an inside part of said fine-filtering cartridge and said small barrel.

8. A filter according to claim 1, wherein said compensating spring is frustoconical with its largest turn against said lower base plate of the fine-filtering cartridge.

* * * * *

UNITED STATES PATENT AND TRADEMARK OFFICE
CERTIFICATE OF CORRECTION

PATENT NO. : 5,217,606

DATED : June 8, 1993

INVENTOR(S) : Claudio Ramponi et al.

It is certified that error appears in the above-identified patent and that said Letters Patent is hereby corrected as shown below:

Column 2, line 64, after "cartridge" delete ",".
Column 3, line 33, after "housed" insert --,--.
Column 3, line 45, delete "o" and insert --of--.
Column 3, line 63, after "assembled" insert --arrangement, the oblong--.
Column 3, line 64, delete "arrangement, the oblong".
Column 5, line 45, delete "chambers A and B" and insert --first chamber A and third chamber C--.
Column 6, line 41, delete "filtering" and insert --sealing--.
Column 8, line 9, delete "subject" and insert --subjected--.

Signed and Sealed this

Eighth Day of March, 1994

Attest:

BRUCE LEHMAN

*Attesting Officer*     *Commissioner of Patents and Trademarks*